(12) United States Patent
Epstein et al.

(10) Patent No.: US 12,128,778 B2
(45) Date of Patent: Oct. 29, 2024

(54) THERMALLY CONTROL INTEGRATED HIGH RATE RECHARGING STATION COMBINED WITH DATA CENTER AND NETWORKING

(71) Applicant: Lightening Energy, Summit, NJ (US)

(72) Inventors: Michael L. Epstein, Bedminster, NJ (US); Eric Materniak, Morristown, NJ (US)

(73) Assignee: Lightening Energy, Summit, NJ (US)

( * ) Notice: Subject to any disclaimer, the term of this patent is extended or adjusted under 35 U.S.C. 154(b) by 351 days.

(21) Appl. No.: 17/376,440

(22) Filed: Jul. 15, 2021

(65) Prior Publication Data

US 2022/0016990 A1 Jan. 20, 2022

Related U.S. Application Data

(60) Provisional application No. 63/052,197, filed on Jul. 15, 2020.

(51) Int. Cl.
| | |
|---|---|
| *H02J 7/00* | (2006.01) |
| *B60L 50/60* | (2019.01) |
| *B60L 53/16* | (2019.01) |
| *B60L 53/302* | (2019.01) |
| *B60L 53/50* | (2019.01) |
| *B60L 53/66* | (2019.01) |
| *B60L 58/10* | (2019.01) |
| *B60L 58/26* | (2019.01) |
| *H04L 9/00* | (2022.01) |
| *H04L 9/32* | (2006.01) |
| *H05K 7/20* | (2006.01) |

(52) U.S. Cl.
CPC ............ *B60L 53/302* (2019.02); *B60L 50/60* (2019.02); *B60L 53/16* (2019.02); *B60L 53/50* (2019.02); *B60L 53/66* (2019.02); *B60L 58/10* (2019.02); *B60L 58/26* (2019.02); *H04L 9/32* (2013.01); *H04L 9/50* (2022.05); *H05K 7/20781* (2013.01); *Y02T 90/12* (2013.01); *Y02T 90/14* (2013.01)

(58) Field of Classification Search
CPC ........ B60L 53/302; B60L 53/16; B60L 53/50; B60L 53/66; B60L 58/10; B60L 58/26; B60L 50/60; H04L 9/32; H04L 9/50; Y02T 90/12; Y02T 90/14; H05K 7/20781
USPC ........................................... 320/109; 701/22
See application file for complete search history.

(56) References Cited

U.S. PATENT DOCUMENTS

| 10,238,011 B1 * | 3/2019 | Cui .................... H05K 7/20736 |
| 2012/0056588 A1 * | 3/2012 | Cai ......................... H02J 7/342 |
| | | 320/128 |

FOREIGN PATENT DOCUMENTS

WO    WO-2019162680 A1 *  8/2019  .............. B60L 50/60

* cited by examiner

*Primary Examiner* — Zixuan Zhou
(74) *Attorney, Agent, or Firm* — Davidson Kappel LLC

(57) ABSTRACT

An electric vehicle recharging station for recharging a battery of an electric vehicle includes a thermal management system including a coolant source of liquid coolant; a power source; an electric vehicle recharger configured for providing the liquid coolant from the coolant source to the battery of the electric vehicle while charging the electric vehicle via the power source; and a data center including a plurality of servers. The thermal management system is configured for providing liquid coolant from the coolant source to the servers.

13 Claims, 6 Drawing Sheets

1

THERMALLY CONTROL INTEGRATED HIGH RATE RECHARGING STATION COMBINED WITH DATA CENTER AND NETWORKING

This claims priority of U.S. Provisional Patent Application No. 63/052,197 filed Jul. 15, 2020 and hereby incorporated-by-reference herein.

The present disclosure relates generally to electric vehicle recharging stations, and specifically an electric vehicle recharging station operating in conjunction with a data center and optionally integrated in a single system and optionally each integrated system comprising a node in a network.

BACKGROUND

U.S. Pat. No. 8,350,526 B2 discloses an electric vehicle recharging station.

SUMMARY

An electric vehicle recharging station for recharging a battery of an electric vehicle is provided. The electric vehicle recharging station includes a thermal management system including a coolant source of liquid coolant; a power source; an electric vehicle recharger configured for providing the liquid coolant from the coolant source to the battery of the electric vehicle while charging the electric vehicle via the power source; and a data center including a plurality of servers. The thermal management system is configured for providing liquid coolant from the coolant source to the servers.

An electric vehicle is also provided including a first battery compartment housing a first battery; a second battery compartment housing a second battery; and a battery management system configured for controlling recharging and thermal management of the first battery and the second battery and the discharging of the first battery and the second battery.

A network is also provided that includes a plurality of electric vehicle regarding stations. Each station includes a plurality of rechargers for recharging electric vehicle batteries, a data center and a thermal management system of providing coolant to the electric vehicle batteries during recharging. Each of the data centers is distributed as decentralized nodes each provided with distributed ledgers organized as a blockchain.

BRIEF DESCRIPTION OF THE DRAWINGS

The present disclosure is described below by reference to the following drawings, in which.

DETAILED DESCRIPTION

The enormous amount of data that may be generated by autonomous vehicles may require a new method of data storage, transfer and analytics which cannot be met by the existing cloud. Data centers have not been optimized for thermal efficiency and energy use, and often require cooling power greater than the power required to operate the servers alone. In addition, transferring control data for entire fleets of on-road vehicles presents new challenges for the security necessary to keep roadways free from unauthorized tampering and hacking. By combining data centers in close proximity to autonomous vehicles such as semi-trucks, the data from each vehicle can be transferred quickly and effectively to the data center during recharging. By enabling localized data transfer, this also allows primary or secondary control of security that can be decentralized and isolated from the risks of broad intrusion and security compromise. Additionally it can support distributed models for machine learning, where algorithm is trained locally at each data center or aggregated across nodes. The cooling needs of high rate recharging at powers greater than 4 MW are similar to the cooling needs of data centers, and a single thermal management system can provide the cooling and heating needs of the electric vehicles, data center, and restroom/restaurant facilities all at the same location. The electric vehicle, data center, energy storage system, and thermal management system can be integrated into a single system to provide greater energy efficiency and environmental benefit, resulting in cost savings for both the vehicles being charged and the operation of the data centers. By providing localized a secure server, this also can support deployment of a distributed ledger in the proximity of autonomous vehicles for authentication and command and control structure security.

Figure 1:
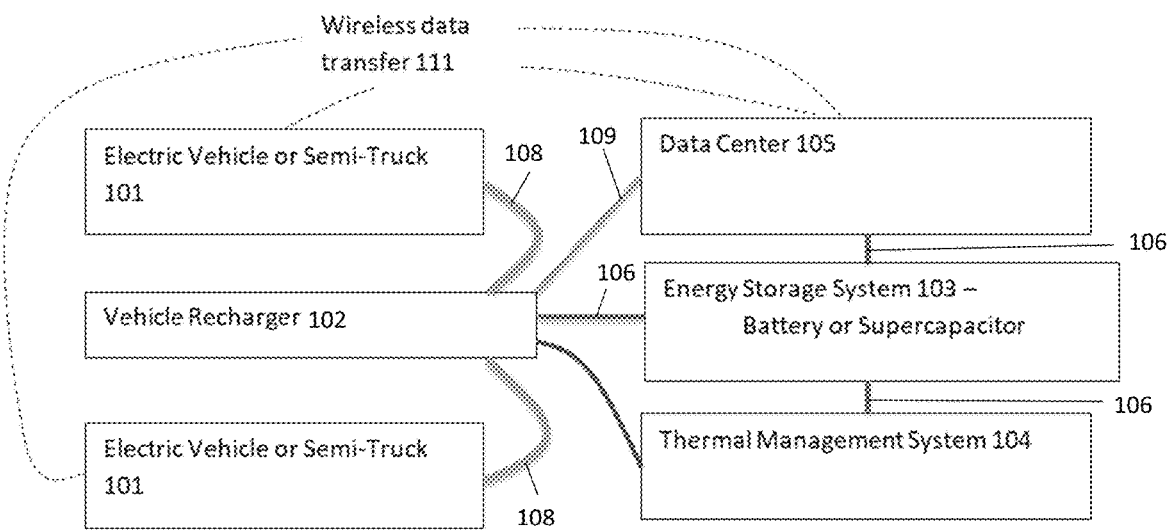
FIG. 1 schematically shows a recharging station recharging vehicles in accordance with an example of the present disclosure.

FIG. 1 schematically shows a recharging station 100 including a recharger 102 for recharging an at least one electric vehicle 101, which may a semi-truck. The electric vehicle 101 may receive high rate recharging from recharger 102, which in one preferred embodiment is at a power greater than 4 MW. This may allow the battery on-board the electric vehicle 101 to charge in a period of less than 5 minutes. The power for the recharging station may come from the grid, but could also be sourced from energy storage system 103. Energy storage system 103 may allow the power needs of the recharging station to be met for a fixed period of time (depending on the battery capacity of energy storage system 103) no matter the status of the grid, and may include the ability to operate during power outages. The energy storage system 103 may consist of batteries or supercapacitors, or a combination of both. In order to provide the high rate recharging at a power greater than 4

MW, a thermal management system 104 may be needed. This system 104 may have the ability to store and pump thermal conditioning fluid into the electric vehicle 101 when the vehicle is connected to the recharger 102.

Due to the amount of data required to operate autonomous vehicles, recharging station 100 also include a data center 105. It is known that operating a single autonomous vehicle can generate up to 30 TB of data per day. This amount of data may need to be processed quickly between the vehicle and a local data center, without having to travel excess distance to the cloud. Such a concept is known as edge computing, and an embodiment of edge computing is shown here in relation to autonomous vehicle operations. The electric vehicle 101 may be an autonomous vehicle and may be configured to autonomously connect to the recharger 102. The data center 105 is arranged and configured to be powered from either the grid, the energy storage system 103, or a combination of both. The lines 106 in FIG. 1 represent the power connections between the energy storage system 103 and the data center 105 and thermal management system 104. The data center 105 may allow data from electric vehicles 101 to be processed. A wired connection would allow the fastest transfer of this data through the data transfer lines 108, 109 shown in the diagram. Optionally, the data could also be transferred wirelessly 111 between electric vehicle 101 and data center 105. This would allow the data center 105 to gather information about or provide updates to the electric vehicle 101 before or after it was connected to the vehicle recharger 102. The data center 105 is also configured to control the autonomous electric vehicle 101 through the wireless data transfer 111 such as input and output of the data center enabling data transfer by way of Bluetooth, other radio-frequency and other wave form energy The data center 105 also may optionally provide access to learning algorithm within or connected to the datacenter.

The data center 105 also may optionally provide access to a distributed ledger directly or indirectly. The distributed ledger enables critical infrastructure protection by optionally providing dual functions of change verification and transaction transparency in the authority of vehicle control, with each change in control verified locally and maintained in a distributed leger supporting authentication. The lines 109 connecting each electric vehicle 101 to the recharger 102 may allow the transfer of electric power, thermal conditioning, and data all in the same line or group of lines. The thermal management system 104 may provide a thermal fluid to the cable and the battery pack on-board the electric vehicle 101.

Figure 2:
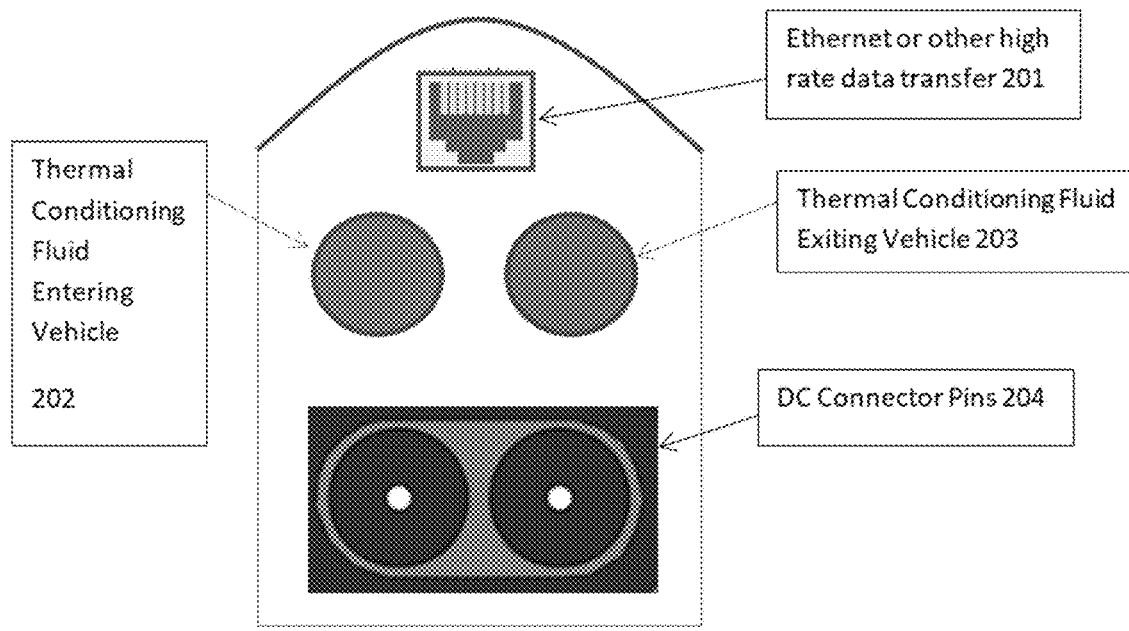
FIG. 2 schematically shows a connector of the recharging station.

FIG. 2 schematically shows a connector 200 of the recharger 102. Connecter 200 is configured for being into a receptacle of the electric vehicles 101 to charge the batteries of vehicles 101. Connector 200 connecting the recharger 102 and the electric vehicle 101 may offer a unique combination of data transfer, thermal conditioning, and high rate recharging. Connector 200 may include an Ethernet or other high rate data transfer port 201 such as 5G. This may allow the 30 TB or more of data to be transferred between the electric vehicle 101 and the data center 105 while the vehicle is at the recharging station. Additionally, connector 200 may allow the transfer of fluid between the thermal management system 104 and the electric vehicle 101. Connector 200 includes port 202 for providing thermal conditioning fluid into the vehicle 101 provides temperature regulation of the battery pack on-board electric vehicle 101. Connector 200 also includes a port 203 for receiving thermal conditioning fluid exiting the vehicle 203, which may be recycled back to the thermal management system to be re-used or pumped to a co-located site that can benefit from the waste heat generated. Connector 200 also includes DC connector pins 204 that may provide the high power necessary to charge the vehicle quickly, such as with DC fast charging that uses between 200-600 volts, and for in other emerging high voltage scenarios charging in a period of less than 5 minutes. Referring back to FIG. 1, thermal management may be needed both for the high power charging of electric vehicle 101 via recharger 102 and for the data center 105. Data centers are typically characterized by a power usage effectiveness (PUE), or the amount of overall power needed for the center compared to the power used by the servers located at that center. Most data centers use air-cooling, which has yielded a power usage effectiveness of 2.5 or even 3.0 for many data centers. Liquid cooling, as proposed in this embodiment, can reduce the PUE to as low as 1.1. This would result in an enormous energy savings for the data center. For example, a data center using 188 servers of 48 TB each would require 1470 kW of power at a PUE of 2.5. If the PUE was reduced from 2.5 to 1.1, this would save an additional 823 kW of power. The cooling capacity required for a data center is similar to the cooling required to charge a semi-truck battery at a power of greater than 4 MW. A single thermal management system 104 can be used to provide coolant to the data center 105, as well as thermal conditioning to the battery on-board the electric vehicle 101.

Using liquid cooling, it can be estimated that the amount of waste heat from both the data center 105 and a recharger 102 used for semi-trucks is at least 213 kW. This amount of heat could be re-purposed for other uses. The amount of energy needed to provide 25 gallons of hot water is approximately 1856 kWh. Given the constant amount of heat generated from semi-truck or other electric vehicle recharging and the operation of the data center, this waste heat could produce up to 25,000 gallons of hot water per year. This hot water may be for public use, such as for example at a truck stop or highway rest area 107 where electric vehicles would need to recharge.

Figure 3:
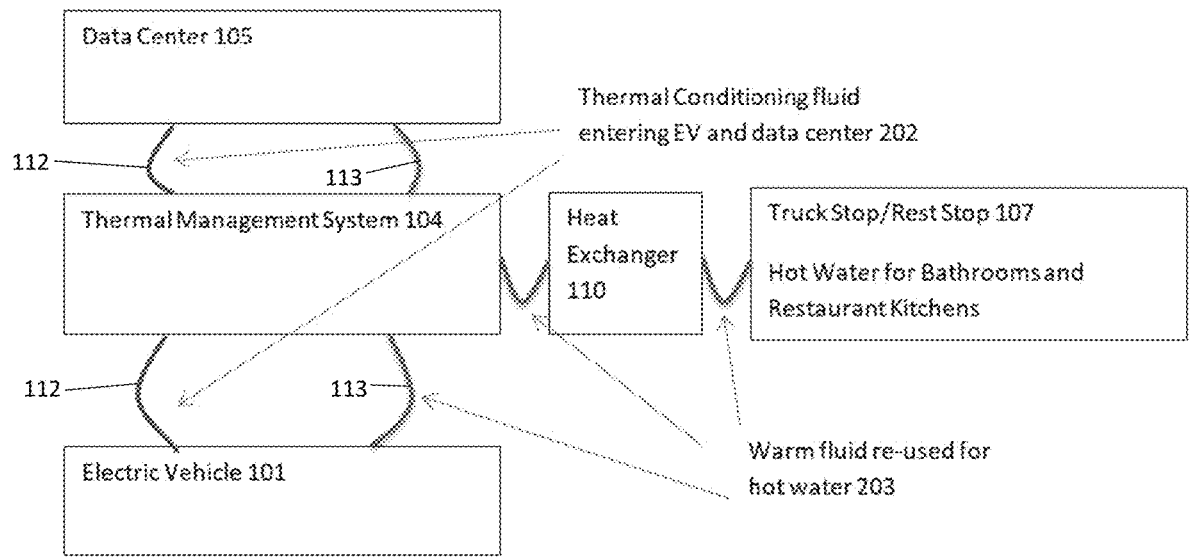
FIG. 3 schematically shows a setup for using waste heat generated by a data center and the electric vehicle recharging station.

FIG. 3 schematically shows a setup for using waste heat generated by a data center 105 and the electric vehicle recharger 102. Lines 112 provide thermal conditioning fluid 202 from the thermal management system 104 to the data center 105 and the electric vehicle 101 help to remove heat effectively during high rate recharging. This waste heat is then removed by lines 113 in the form of a warm fluid 203 exiting the electric vehicle 101 and the data center 105. The two sources of warm fluid are combined and can be re-purposed for hot water, or as input for a gas turbine combined heat and power (CHP) system. An additional heat exchanger 110 may be provided to use the heat of the cooling fluid to heat potable water that could be used in restrooms and kitchens of a highway rest area 107.

Due to data center 105 and recharging station being in continuous operation, a microgrid system 400 may be provided to power the entire facility. Microgrid 400 may include a primary power source, which may include renewables such as solar and wind power generators 112. Microgrid 400 may also include gas turbines to provide the base-load power 113 needed to support the data center 105 and recharging infrastructure. Often times, renewables provide intermittent power but the base-load needs of the data center 105 and recharging station may be met with one or more other power sources that are more constant, such as gas turbines and CHP. The waste heat removed from the data center 105 and the electric vehicles 101 may be re-used as input for the gas turbines to increase the efficiency and reduce overall $CO_2$ emissions. If the primary power includes CHP, then the waste heat produced may be directed to the thermal management system 104 for use in either the rest area 107 or for thermal conditioning of the batteries on-board the electric vehicle 101. Depending on the price of electricity at the location of the recharging station, the grid 114 may also be used as the primary power source.

Figure 4:
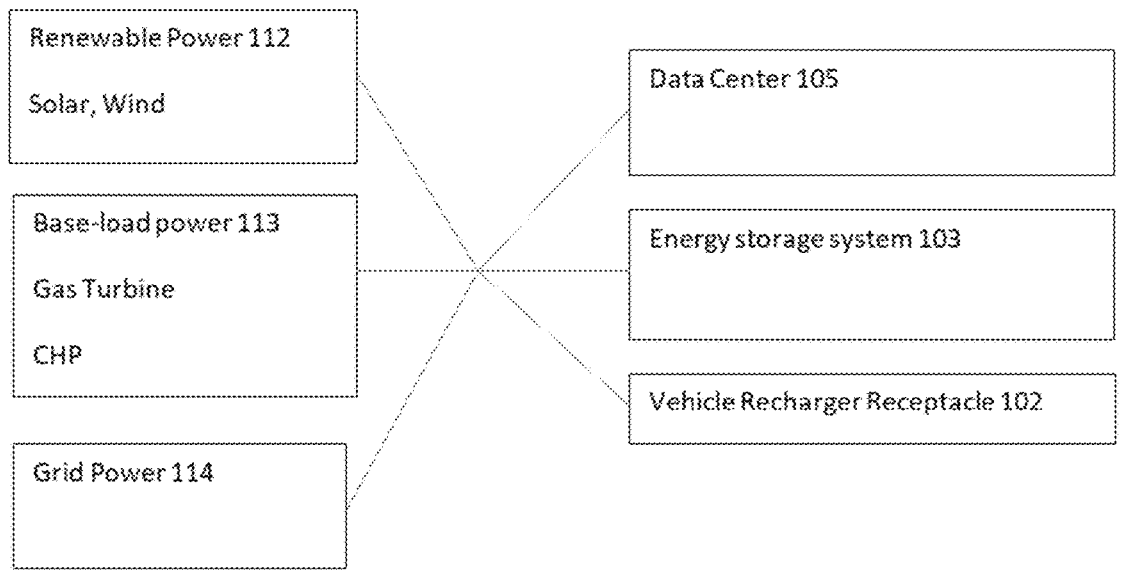
FIG. 4 schematically shows a microgrid system integrated with a data center, a vehicle recharger and an energy storage.

FIG. 4 schematically shows a microgrid system integrated with data center 105, a vehicle recharger 102 and an energy storage system 103. In this microgrid system, the source of power can come from the grid 114, renewables 112, or another primary power source 113, including base-load power, a gas turbine or CHP. These multiple sources of power may be used to meet the needs of the data center 105, the recharging receptacle 102, and the energy storage system 103. The energy storage system 103 can store energy from intermittent sources such as renewable power 112, and then provide that power to the data center 105 and recharging receptacle 102 when other sources are not available or are too costly to operate.

Figure 5:
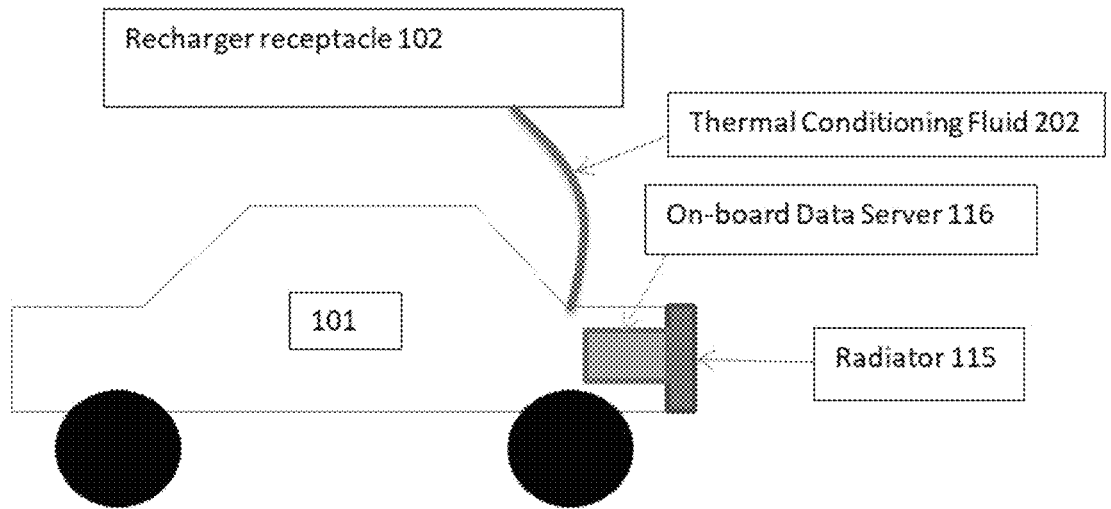
FIG. 5 schematically shows a vehicle including an on-board data server.

FIG. 5 schematically shows a vehicle 101 including an on-board data server 116. As mentioned prior, the amount of data that an autonomous electric vehicle 101 can generate may be at least 30 TB per day. If this data cannot be sent to a local data center immediately, then there may be the need for an on-board data server 116. The function of this data server may primarily be to store data generated by the autonomous vehicle. Then once the electric vehicle 101 pulls up to the recharging receptacle 102, the data stored on the on-board server 116 can be transferred to data center 105, which would be located in close proximity to the rechargers 102. The on-board data server 116 may need to be cooled both during times of normal vehicle operation and during recharging and data transfer. If the electric vehicle 101 is connected to recharging receptacle 102, then a thermal conditioning fluid can be provided via connector port 202 and delivered to the vehicle 101 to assist in cooling the on-board data server 116. Optionally during normal vehicle operation when the electric vehicle 101 is not connected to any recharger, the radiator 115 of the vehicle 101 can provide air cooling to on-board data server 116. The on-board server 116 may be located adjacent to the radiator 115 in order to gain the maximum benefit from the air cooling provided.

Figure 6:
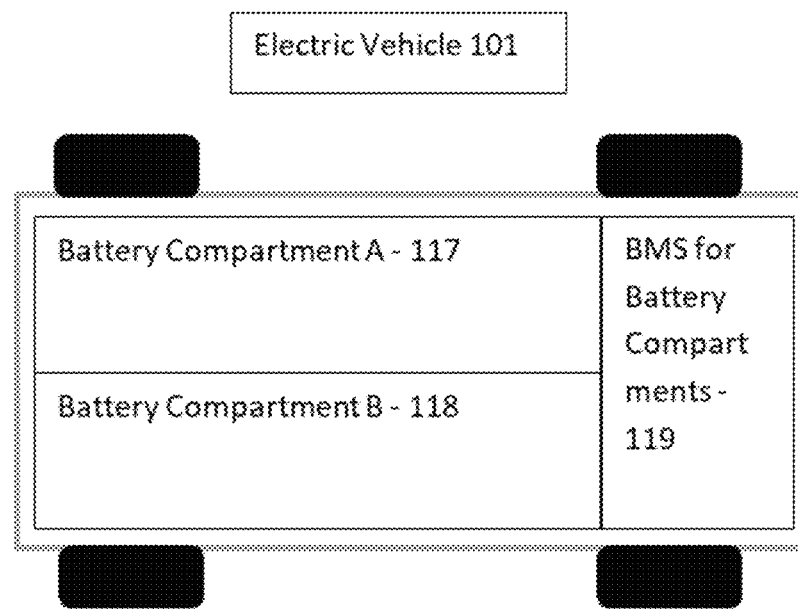
FIG. 6 schematically shows an electric vehicle with two battery compartments containing different battery types and a battery management system.

FIG. 6 schematically shows an electric vehicle 101 with two battery compartments 117, 118, each containing a different battery type, and a battery management system 119. Batteries included in electric vehicle 101 may include lithium-ion, lithium-sulfur, and supercapacitors. The battery pack on-board electric vehicle 101 may include at least two battery compartments 117, 118. FIG. 6 below shows how those compartments can be divided on a typical electric vehicle chassis. Battery compartment A 117 may include one type of battery, and battery compartment B 118 may include a different type of battery or supercapacitor. The on-board BMS 119 may regulate the power output of each type of battery for the best vehicle performance depending on where the vehicle is in its duty cycle. For instance, if the first battery has higher discharge power capabilities than the second battery, BMS 119 may regulate the batteries such that the first battery may be used to provide the necessary power for acceleration and acceptance of rapid recharging, including a power of greater than 4 MW. The second battery on-board electric vehicle 101 may include a higher energy density chemistry than the first battery, and the second battery may be used when the vehicle range needs to be maximized. This solution may enable the most cost effective combination of batteries to be selected for a particular vehicle type. The on-board BMS 119 is configured to control whether one of the batteries is used, or whether both batteries used to provide power to the electric vehicle 101. The on-board BMS 119 may also control the amount of thermal conditioning fluid entering each battery compartment. The on-board data server 116 may serve as a storage space for the historical charging and use information pertaining to electric vehicle 101.

Figure 7:
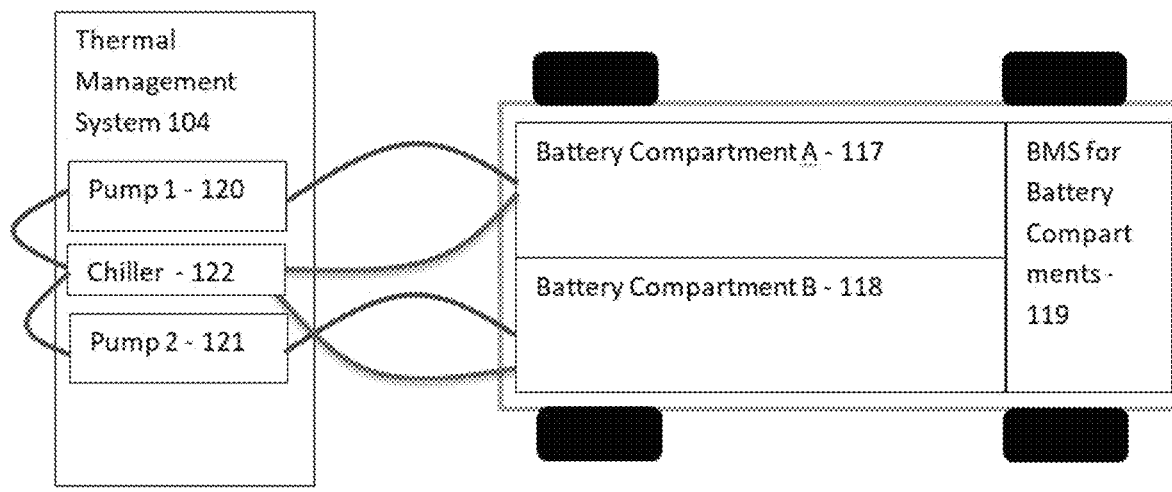
FIG. 7 schematically shows a thermal management system including dual pumps to regulate flow of thermal conditioning fluid to two separate batteries of the vehicle shown in FIG. 6.

FIG. 7 schematically shows a thermal management system 104 including dual pumps 120, 121 to regulate flow of thermal conditioning fluid to two separate batteries of the vehicle with two battery compartments 117, 118. The battery in compartment 117 and the battery in compartment 118 may have different limiting rates at which the respective battery can be charged. Each pump 120, 121 may be configured to regulate the flow of thermal conditioning fluid into the respective battery compartment 117, 118. If one battery compartment 117, 118 has a battery that needs to charge at a faster rate than the battery of the other compartment 117, 118, then one pump 120, 121 may operate at a different flow rate than the other pump 120, 121 in order to meet the thermal requirements for the overall battery pack. It is also possible that only the battery of one compartment may be charged, in which case only one of pumps 120, 120 within thermal management system 104 is operated. The fluid exiting each battery compartment may be combined and fed into a single chiller 122 to reduce the temperature of the thermal conditioning fluid. After this point, the fluid may be separated into multiple lines and fed back into each pump 120, 121 again. If only a single pump 120, 121 needs to be operated, then thermal management fluid may be transferred between battery compartment A 117 and battery compartment B 118. In other examples, more than two pumps and more than two battery compartments may be included.

Figure 8:
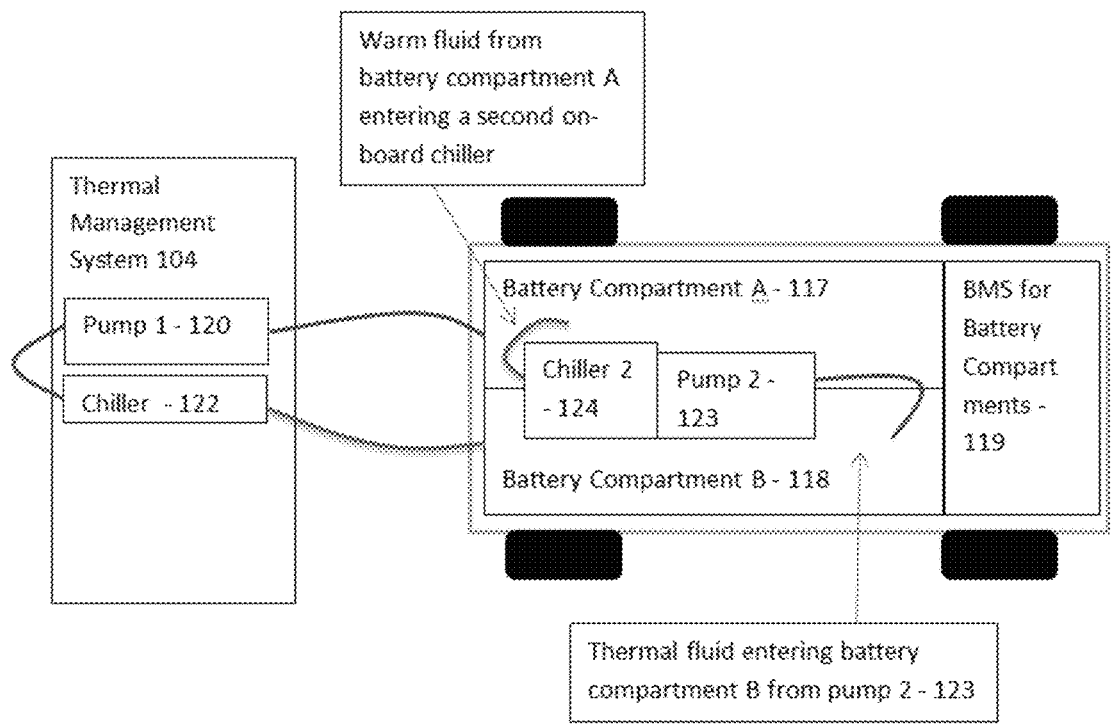
FIG. 8 schematically shows a thermal management system and an electric vehicle each including a pump and a chiller.

FIG. 8 schematically shows a thermal management system 104 and an electric vehicle 101 each including a respective pump 120, 123 and a respective chiller 122, 124. Pump 120 serves as the primary pump to deliver thermal conditioning fluid to electric vehicle 101. After this fluid has circulated through the first battery compartment A 117, it can then enter a secondary on-board chiller 124. A secondary pump 123 may boost the flow rate of the thermal conditioning fluid to deliver the fluid at the proper flow rate to battery compartment B 118. The secondary on-board pump 123 may be lighter weight and smaller in size than the off-board pump 120 associated with thermal management system 104. Optionally, the thermal conditioning fluid on-board the vehicle circulating through battery compartment A 117 can bypass the secondary chiller 124 and go straight to the secondary on-board pump 123 before entering battery compartment B 118. If the flow of the thermal conditioning fluid exiting battery compartment A only needs to be cooled but does not need to increase its flow rate, then the fluid can enter the secondary on-board chiller 124 and bypass the secondary on-board pump 123. Alternatively, the thermal conditioning fluid may bypass both the secondary on-board pump 123 and chiller 124 and directly enter battery compartment B 118. After the thermal conditioning fluid has exited battery compartment B 118, it may be directed back to the chiller 122 associated with thermal management system 104 which is off-board the electric vehicle 101.

Figure 9:
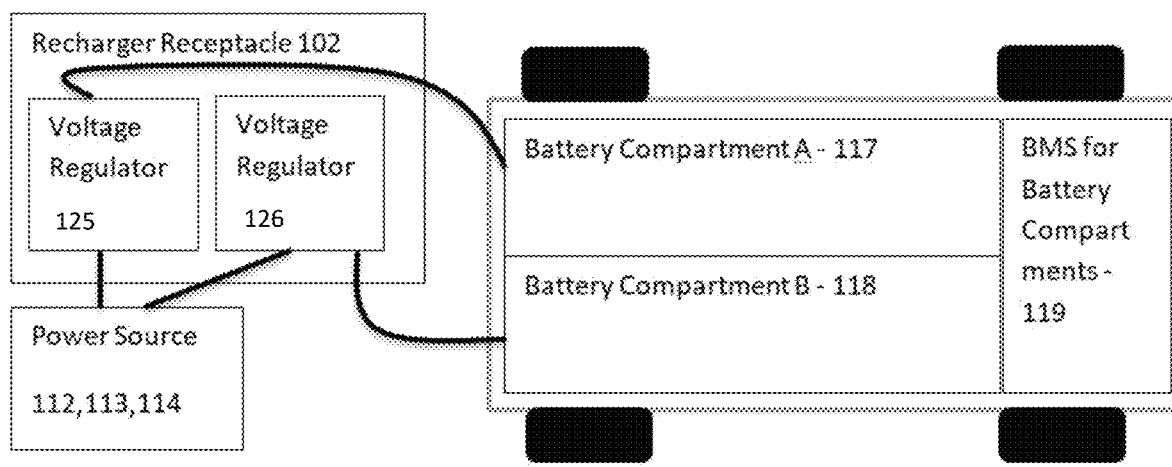
FIG. 9 schematically shows an electric vehicle and a recharger provided with multiple voltage regulators.

FIG. 9 schematically shows an electric vehicle 101 and a recharger 102 provided with multiple voltage regulators 125, 126. Since the battery or supercapacitor located in battery compartment A 117 may need to charge at a different rate than the battery or supercapacitor in battery compartment B 118, the voltage and/or current entering each compartment may need to be regulated. Voltage regulators 125, 126 maintain the DC output voltage during battery charging. Each battery used in the electric vehicle has a certain internal resistance, and this internal resistance may fluctuate depending on the battery temperature and state of charge. In order to maintain a desired current during charging, the voltage regulators 125, 126 may provide a certain voltage so that the current going through the battery pack remains constant. If the batteries in compartment 117, 118 are of different chemistries or different capacities, then the maximum charge current may be different for each battery, and a separate respective voltage regulator 125, 126 is provided for each battery. Voltage regulator 125 controls the output voltage of the recharger 102 going into battery compartment A 117. Voltage regulator 126 controls the output voltage of the recharger receptacle 102 going into battery compartment B 118. In other embodiments, a single voltage regulator may control the input voltage to multiple battery compartments, or more than two voltage regulators may control the input voltage to each battery compartment.

Figure 10:
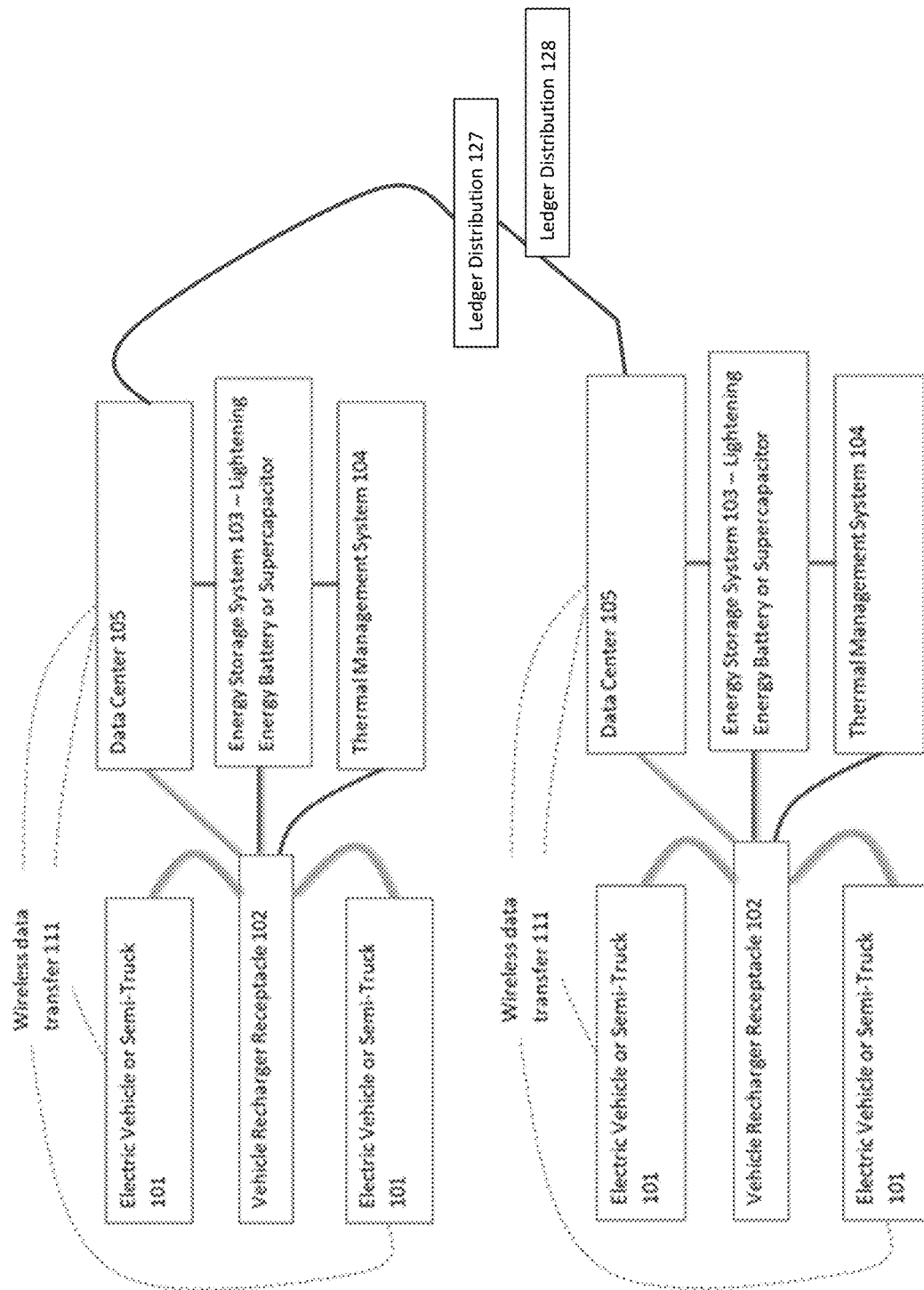
FIG. 10 schematically shows a distributed network of thermally control integrated high rate recharging stations combined with data centers.

FIG. 10 schematically shows a distributed network of thermally control integrated high rate recharging stations combined with data centers. Transportation devices are at the risk of being commandeered by hostile actors to enable destruction or to immobilize societies and economies. Correspondingly, there are national security interests in securing autonomous vehicles from broad scale tampering or hijacking, where in the extreme, a centrally controlled fleet may be disabled or directed as many weapons of destruction. The network of FIG. 10 can ensure the command and control functions in autonomous vehicles are secure and immune from centralized attack. This may occur passively by isolating each recharging station including the energy storage system 103, thermal management system 104, and data center 105 into a node. Optionally, the data center 105 of each node provides an audit function of the vehicle control system each time vehicle 101 is recharged by physical connection, or without recharging, the node may provide a wireless audit for any vehicles in range of the node at a frequency interval or condition that is pre-determined or machine-learned.

A network of nodes is comprised of more than one affiliated node, as illustrated in FIG. 10. This network optionally may include one or more distributed ledger 127 and 128, directly or indirectly supporting the network, optionally affiliated more broadly with other decentralized servers and ledgers. Since large centralized cloud or data farms are vulnerable to a breach that creates wide spread in consequence, the data centers of the network provide a more distributed command and control relationships with vehicles, thereby supporting resilience through decentralization. An attack on one node does not necessarily comprise an attack on other nodes. One or more distributed ledger 127, 128 may be organized as a blockchain where the integrity of changing data (such as command and control data) is verified by the entire blockchain and provided with authentication and transparency at each node and throughout the network, thereby further improving security.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

What is claimed is:

1. An electric vehicle recharging station for recharging a battery of an electric vehicle, the electric vehicle recharging station comprising:
   a thermal management system including a coolant source of liquid coolant;
   a power source;
   an electric vehicle recharger configured for providing the liquid coolant from the coolant source to the battery of the electric vehicle while charging the electric vehicle via the power source; and
   a data center including a plurality of servers, the thermal management system configured for providing liquid coolant from the coolant source to the plurality of servers,
   wherein the data center is configured to upload 30 TB or more of data from an on-board data server of the electric vehicle to the plurality of servers during recharging of the battery by the electric vehicle recharger.

2. The electric vehicle recharging station as recited in claim 1 wherein the electric vehicle recharger includes a connector for connecting to the electric vehicle and providing electricity and the liquid coolant into the electric vehicle, the connector including a data transfer port for transmitting data from the on-board data server to the plurality of servers of the data center.

3. The electric vehicle recharging station as recited in claim 1 wherein the electric vehicle recharger is configured for recharging batteries at powers greater than 4 megawatt (MW).

4. The electric vehicle recharging station as recited in claim 1 wherein the power source is base-load power, a gas turbine or a combined heat and power system.

5. The electric vehicle recharging station as recited in claim 1 wherein the power source is a power grid.

6. The electric vehicle recharging station as recited in claim 1 wherein the power source is a renewable energy source.

7. The electric vehicle recharging station as recited in claim 1 further comprising a heat exchanger arranged and configured to heat hot water for public use using the heat generated by batteries of electric vehicles recharged by the electric vehicle recharger and heat generated by the plurality of servers of the data center.

8. An electric vehicle recharging station for recharging a battery of an electric vehicle, the electric vehicle recharging station comprising:
   a thermal management system including a coolant source of liquid coolant, and a first coolant line and a second coolant line configured for delivering the liquid coolant from the coolant source;
   an electric vehicle recharger configured for providing the liquid coolant from the coolant source to the battery of the electric vehicle by the first coolant line while charging the electric vehicle via a power source; and
   a data center including a plurality of servers, the thermal management system configured for providing liquid coolant from the coolant source to the plurality of servers by the second coolant line,
   the electric vehicle recharger including a connector for being inserted into a receptacle of the electric vehicle, the connector including:
      a first coolant port configured for providing the liquid coolant into the electric vehicle;
      a second coolant port configured for receiving the liquid coolant exiting the electric vehicle;

electrical connector pins configured for providing electricity to the electric vehicle; and a data transfer port configured for physically engaging the electric vehicle for transmitting data from an on-board data server of the electric vehicle to the plurality of servers of the data center while the electric vehicle is at the electric vehicle recharger.

9. The electric vehicle recharging station as recited in claim 8, wherein the data transfer port is configured for physically engaging the electric vehicle for transmitting 30 TB or more of data from the on-board data server to the plurality of servers of the data center while the electric vehicle is at the electric vehicle recharger.

10. The electric vehicle recharging station as recited in claim 8, wherein the data transfer port is an Ethernet port.

11. The electric vehicle recharging station as recited in claim 8, wherein the data center is configured to transmit updates to the on-board data server to the plurality of servers of the data center while the electric vehicle is at the electric vehicle recharger.

12. An electric vehicle recharging station for recharging a battery of an electric vehicle, the electric vehicle recharging station comprising:

an electric vehicle recharger configured for providing liquid coolant to the battery of the electric vehicle while charging the electric vehicle via a power source;

a data center including a plurality of servers;

a single thermal management system configured to provide coolant both the electric vehicle and the data center, the single thermal management system including:

a coolant source of liquid coolant;

a first coolant delivery line for delivering the liquid coolant from the coolant source to the electric vehicle recharger for providing the liquid coolant to the battery of the electric vehicle while charging the electric vehicle via a power source;

a first coolant return line for returning the liquid coolant removing waste from the electric vehicle to the coolant source;

a second coolant delivery line for delivering the liquid coolant from the coolant source to the plurality of servers; and a second coolant return line for returning the liquid coolant removing waste from the plurality of servers to the coolant source.

13. The electric vehicle recharging station as recited in claim 12, wherein the electric vehicle is a semi-truck and the single thermal management system is configured such that an amount of waste heat removed from both the data center and the electric vehicle recharger during the charging of the semi-truck is at least 213 kW.

* * * * *